United States Patent [19]

Thoma

[11] Patent Number: 5,170,707
[45] Date of Patent: Dec. 15, 1992

[54] ADJUSTING DEVICE FOR VARYING A PHASE ANGLE BETWEEN AN INPUT SHAFT AND AN OUTPUT SHAFT OF A CHAIN DRIVE IN A SHEET-FED PRINTING PRESS

[75] Inventor: Peter Thoma, Mannheim, Fed. Rep. of Germany

[73] Assignee: Heidelberger Druckmaschinen AG, Heidelberg, Fed. Rep. of Germany

[21] Appl. No.: 757,552

[22] Filed: Sep. 11, 1991

[30] Foreign Application Priority Data

Sep. 11, 1990 [DE] Fed. Rep. of Germany ....... 4028756

[51] Int. Cl.⁵ .............................................. B65H 5/34
[52] U.S. Cl. .................................... 101/232; 474/117; 474/900
[58] Field of Search ................ 101/232; 474/111, 117, 474/135, 138, 139, 900; 198/813, 814; 242/75.3; 271/202

[56] References Cited

U.S. PATENT DOCUMENTS

| | | | |
|---|---|---|---|
| 1,819,743 | 8/1931 | Duncan | 474/900 |
| 2,352,797 | 7/1944 | Miller | 474/900 |
| 3,166,947 | 1/1965 | Hendershot | 474/900 |
| 3,913,410 | 10/1975 | Ackerman | 474/138 |
| 4,557,711 | 12/1985 | Yamanashi et al. | 474/900 |
| 4,791,869 | 12/1988 | Furukawa | 101/232 |
| 5,074,208 | 12/1991 | Filsinger | 101/232 |

Primary Examiner—Clifford D. Crowder
Assistant Examiner—Stephen R. Funk
Attorney, Agent, or Firm—Herbert L. Lerner; Laurence A. Greenberg

[57] ABSTRACT

An adjusting device for varying a phase angle between a drive shaft and a driven shaft of an endless chain drive extending between a sheet feeder and a printing unit of a printing press and being formed with a tight side and a slack side defining an inner space therebetween includes a first tensioning element for applying a tensioning force outwardly from the inner space against the slack side of the endless chain drive, a second tensioning element for applying a tensioning force outwardly from the inner space against the tight side of the endless chain drive, a slide carrying the first and the second tensioning elements and being displaceable substantially perpendicularly to a plane in which the drive shaft and the driven shaft are disposed, and one additional chain tensioning device for applying a force from outside the endless chain drive against the slack side thereof, the additional chain tensioning device being adjustably movable with respect to the first tensioning element.

6 Claims, 7 Drawing Sheets

ADJUSTING DEVICE FOR VARYING A PHASE ANGLE BETWEEN AN INPUT SHAFT AND AN OUTPUT SHAFT OF A CHAIN DRIVE IN A SHEET-FED PRINTING PRESS

BACKGROUND OF THE INVENTION

1. Field of the Invention

The invention relates to an adjusting device for varying the phase angle between an input shaft and an output shaft of an endless chain drive between a sheet feeder and a printing unit of a sheet-fed printing press, wherein the chain drive is formed with a tight side and a slack side and defines an inner space.

Such an adjusting device provides an infinitely variable adjustment of phase between the sheet feeder and the printing unit in order to accommodate them to different operating conditions arising from different press speeds. It is thus possible, in particular, to achieve a phase lead of the sheet in the feeder in order to compensate, at high press speeds, for delays in the arrival of the sheet, so that the leading edge of the sheet will have safely and reliably reached the front lays by the time the transverse alignment has taken place.

2. Description of the Related Art

An adjusting device has become known heretofore from U.S. Pat. No. 4,791,869 wherein a tensioning element acting outwardly from within against the tight side of a chain and against the slack side thereof are disposed on a common slide which, for the purpose of phase adjustment, is displaceable substantially perpendicularly to a plane in which respective axes of the two shafts are disposed. The two tensioning elements, one of which acts from the inside against the tight side of the chain drive and the other of which acts from the inside against the slack side of the chain drive, are pretensioned in the direction of action by a spring.

A comparable device has also become known heretofore from U.S. Pat. No. 1,819,743 wherein the slide for the adjustment is guided on laterally disposed rods, and the adjustment of the slide is accomplished by means of a rotatable spindle having a male thread which engages with a female thread formed in the slide.

SUMMARY OF THE INVENTION

It is accordingly an object of the invention to provide an adjusting device for varying the phase angle between an input shaft and an output shaft of a chain drive between a sheet feeder and a printing unit of a sheet-fed printing press, which operates in an improved manner and exhibits greater accuracy in the maintenance of the set phase angle, especially at high press speeds.

With the foregoing and other objects in view, there is provided, in accordance with the invention, an adjusting device for varying a phase angle between a drive shaft and a driven shaft of an endless chain drive extending between a sheet feeder and a printing unit of a printing press and being formed with a tight side and a slack side defining an inner space therebetween, comprising first tensioning means for applying a tensioning force outwardly from the inner space against the slack side of the endless chain drive, second tensioning means for applying a tensioning force outwardly from the inner space against the tight side of the endless chain drive, a slide carrying the first and the second tensioning means and being displaceable substantially perpendicularly to a plane in which the drive shaft and the driven shaft are disposed, and additional chain tensioning means for applying a force from outside the endless chain drive against the slack side thereof, the additional chain tensioning means being adjustably movable with respect to the first tensioning means.

Due to these features, the additional chain tensioner holds the slack side of the chain drive at a prescribed angle of contact against the tensioning element which acts upon the slack side from within the space defined by the endless chain drive. In conjunction with the tensioning element which acts from within against the slack side, the additional chain tensioner, which acts to a certain extent as a chain-storage device, maintains the slack side under uniform tension, even at high press speeds, and removes any slack from the slack side of the chain. To achieve this objective, in accordance with another feature of the invention, the additional chain tensioning means have two inwardly acting tensioning elements mounted at respective ends of a yoke adjustable with respect to the slide, the two tensioning elements being disposed at respective opposite sides of the outwardly acting first tensioning means.

A further advantage of the construction according to the invention is that the chain-storage function is maintained in both directions of adjustment beyond the stretched position of the chain. Consequently, it is possible to remove the slack from the slack side of the chain even in positions of maximum adjustment.

In accordance with an additional feature of the invention, the adjusting device includes spring means for applying a load to the tensioning elements so that the tensioning elements act from the outside against the slack side of the endless chain drive. Thus, the two tensioning elements of the additional chain tensioner acting against the slack side from the outside, on the one hand, and the tensioning element acting from within against the slack side, on the other hand, are preloaded in their respective directions of action by a spring, so that the action of said spring tension results in uniform tightening of the slack side. The spring tension may additionally be adjustable in order to permit further adaptation to different operating conditions at varying press speeds.

In accordance with yet another feature of the invention, there are provided a spindle extending transversely to the plane in which the shafts are disposed, and a spring surrounding the spindle, the yoke being displaceably guidable on the spindle and forming a counterbearing for the spring at one end thereof, the spring being supported at the other end thereof by a counterbearing formed on a housing of the device.

In accordance with yet a further feature of the invention, means are provided for varying clamping length of the spring between the respective counterbearings.

In accordance with yet an added feature of the invention, the counterbearing formed on the housing is adjustable.

In accordance with a concomitant feature of the invention, the counterbearing formed on the housing is formed with a female thread engageable with a male thread formed on an extension of the spindle for adjusting the counterbearing with respect to the housing, and the slide is formed with a female thread engageable with a male thread of the counterbearing having a different pitch from that of the thread formed on the spindle.

Assurance is thereby provided that the effective clamping length of the spring between the counterbearing on the yoke and the counterbearing on the housing remains virtually constant throughout the entire adjustment range so that an adjustment of the slide in order to change the phase angle is not necessarily associated with a change in the tensile force of the spring.

Other features which are considered as characteristic for the invention are set forth in the appended claims.

Although the invention is illustrated and described herein as embodied in an adjusting device for varying a phase angle between an input shaft and an output shaft of a chain drive in a sheet fed printing press, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings, in which.

DESCRIPTION OF THE PREFERRED EMBODIMENTS

Figure 1:
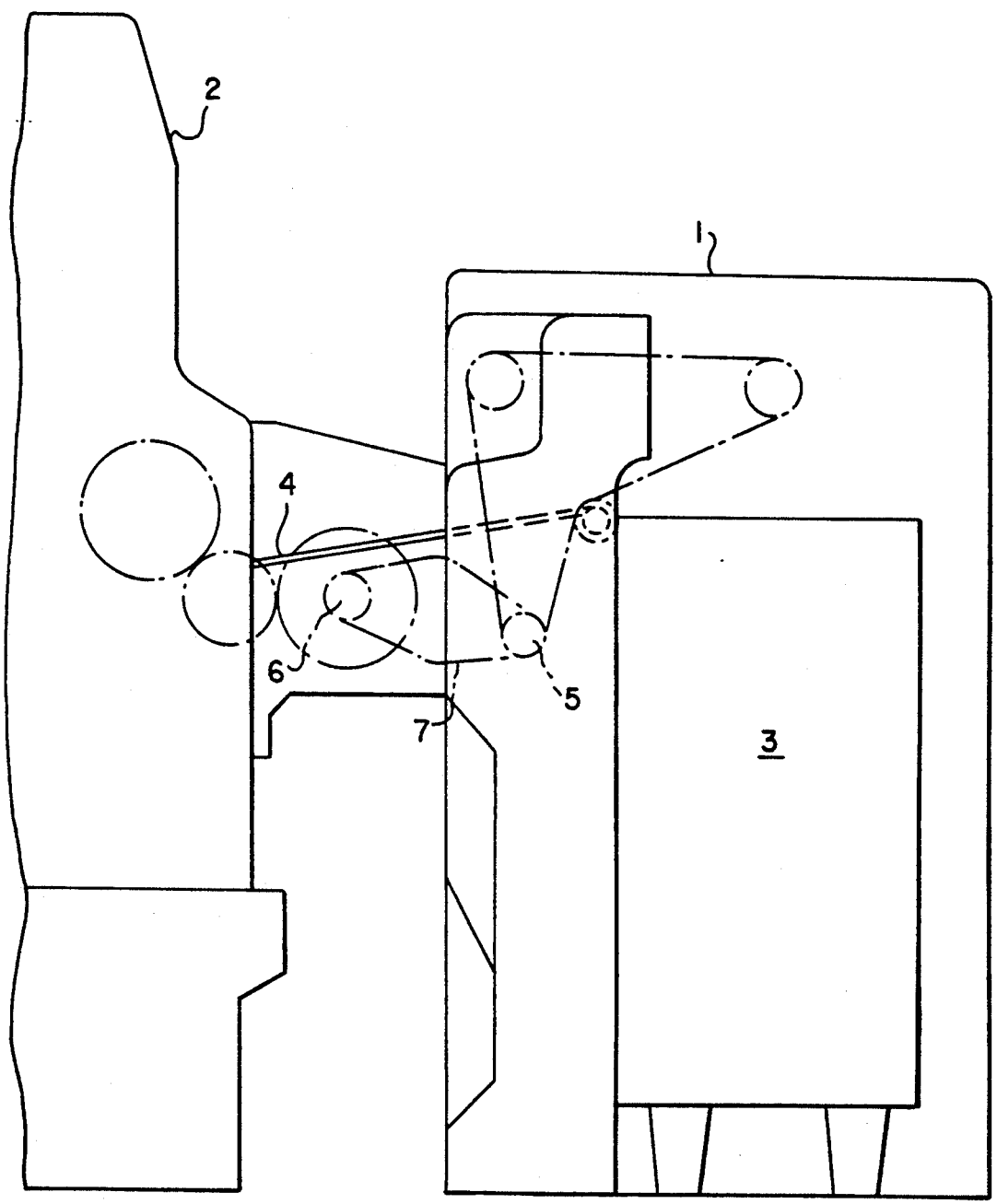
FIG. 1 is a diagrammatic side elevational view of a drive for a shaft of a sheet feeder by a shaft of a printing unit through the intermediary of an endlessly revolving traction or tensioning means.

Referring now to the drawings, the figures therein relate to the drive side of a sheet-fed printing press. In FIG. 1, a feeder 1 is shown disposed upstream of a partially illustrated first printing unit 2 as viewed in sheet travel direction. Sheets lifted from a sheet pile 3 in the feeder 1 are supplied via a feed table 4 to the first printing unit 2.

Figure 2A:
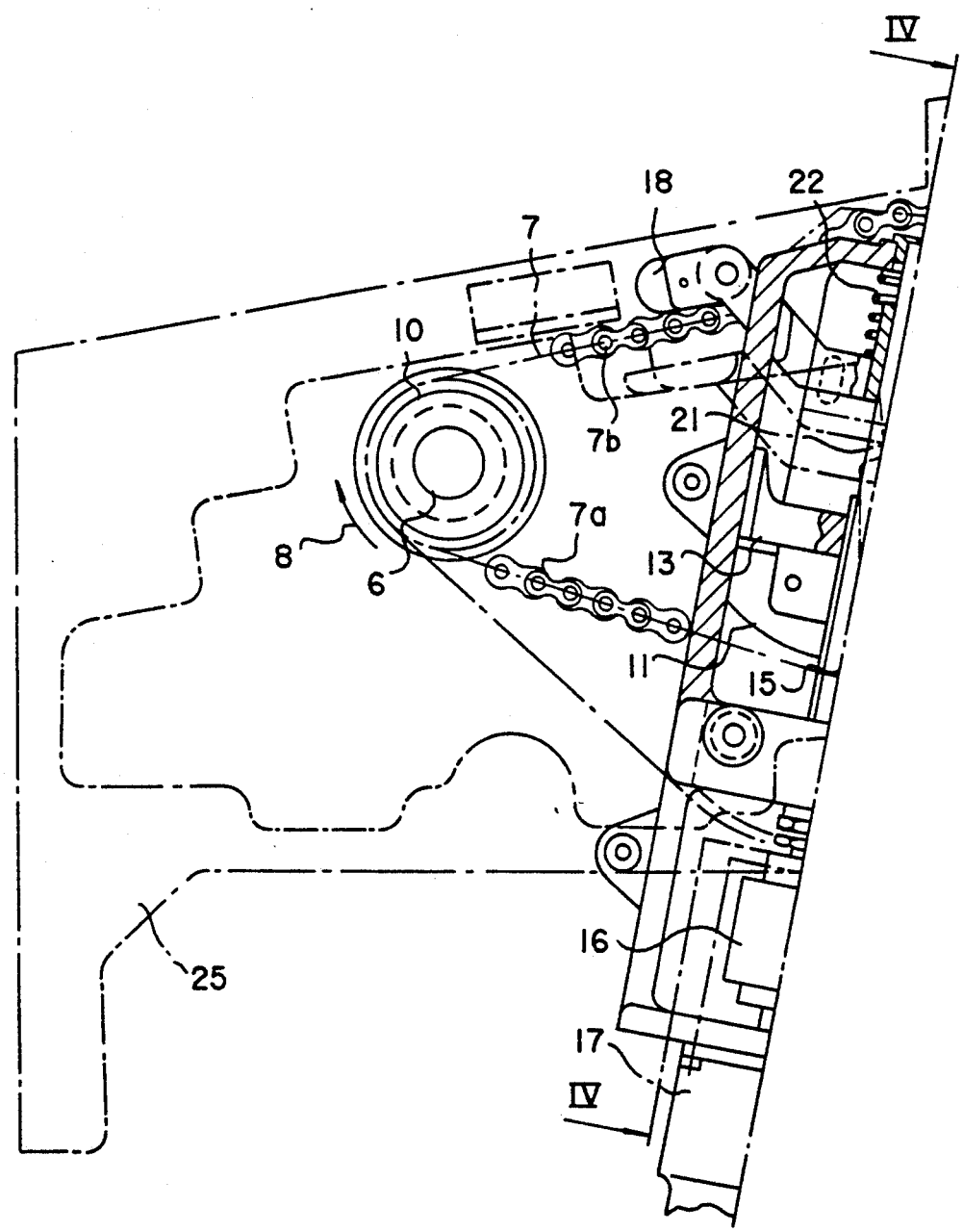
FIGS. 2a and 2b together are an enlarged fragmentary side elevational view of FIG. 1 illustrating the adjusting device for changing the phase angle in accordance with the invention.
Figure 2B:
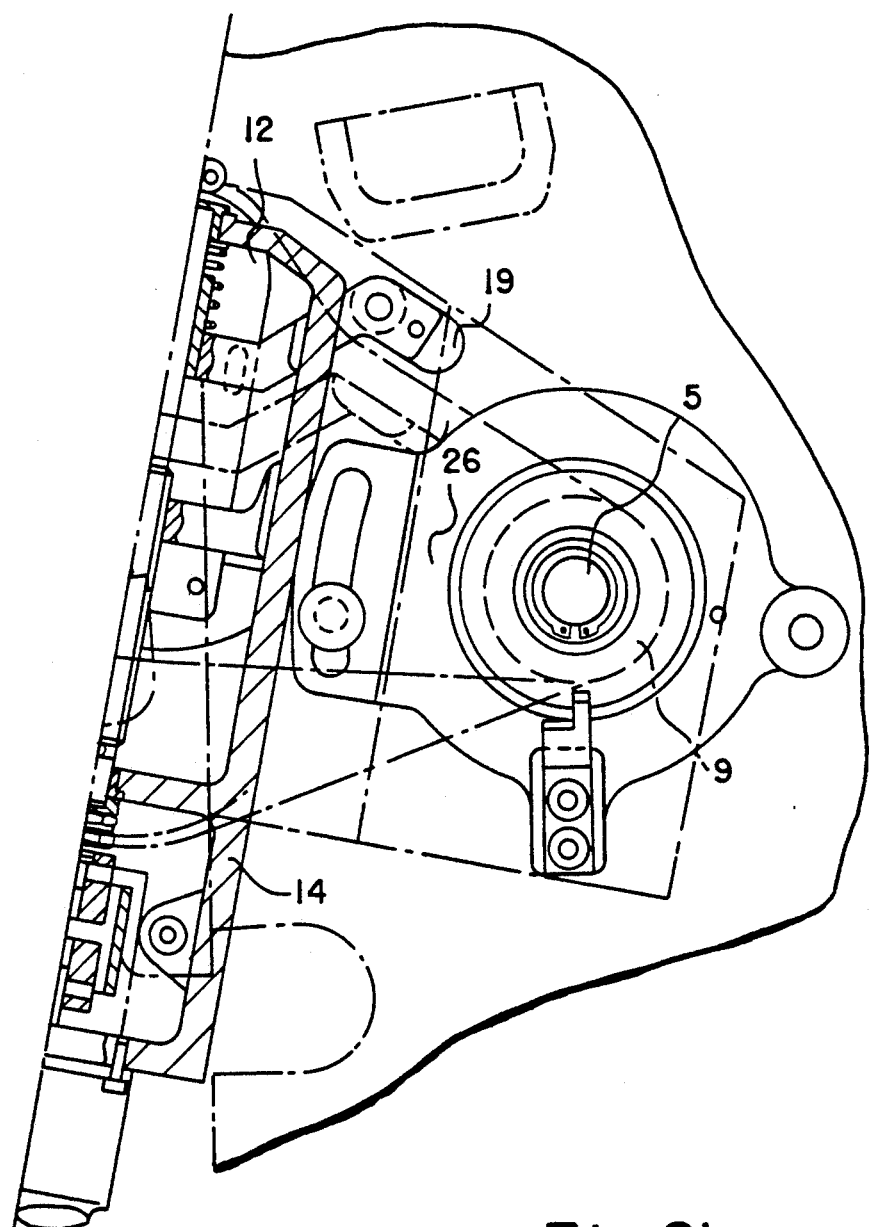
Figure 4:
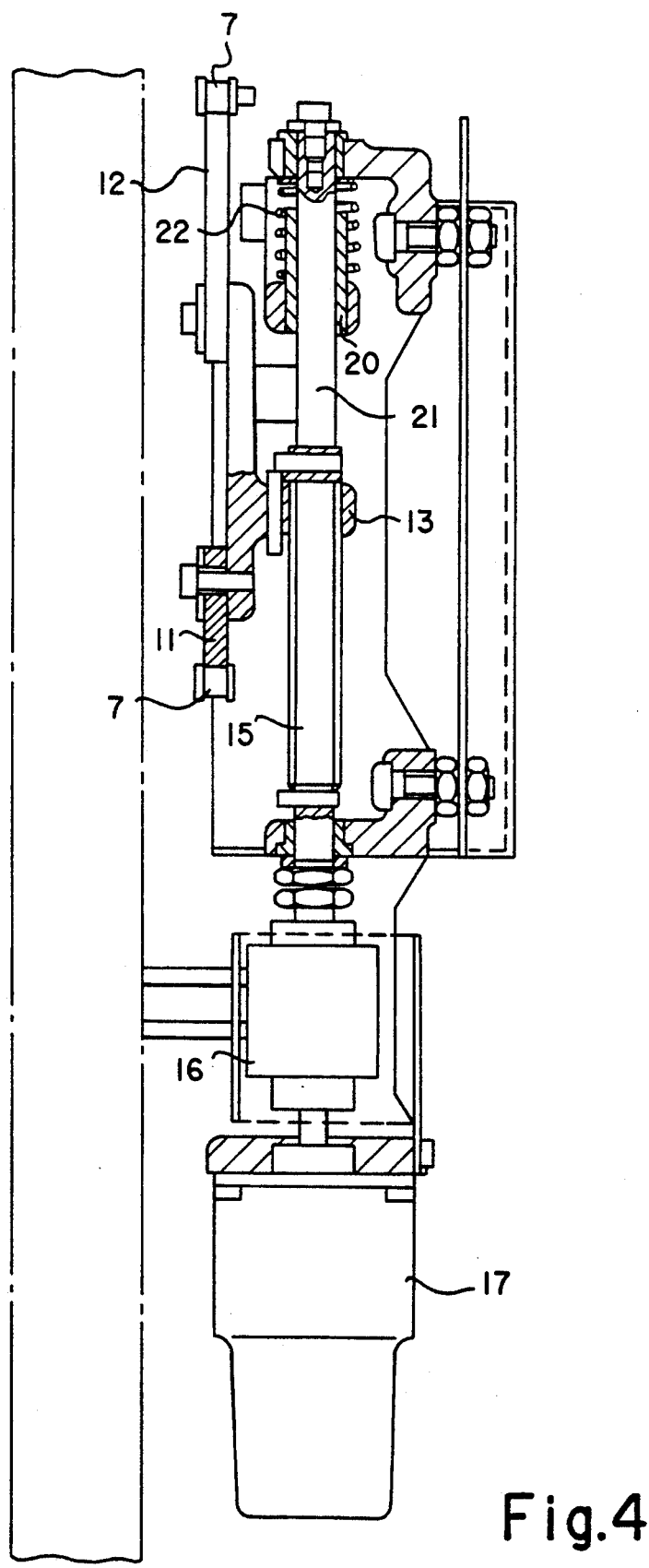
FIG. 4 is a cross-sectional view of FIGS. 2a and 2b taken along the line IV—IV in the direction of the arrows.

A shaft 5 of the feeder 1 is driven in the direction of an arrow 8 shown in FIG. 2a by a shaft 6 of the printing unit 2 by traction means, more particularly an endlessly revolving chain 7, in a manner that the chain 7 has a tight side 7a and a slack side 7b. Approximately intermediate a chain sprocket 9 on the shaft 5 and a chain sprocket 10 on the shaft 6, the tight side 7a of the chain 7 passes over a tensioning element 11, and the slack side 7b of the chain 7 passes over a tensioning element 12, both tensioning elements 11 and 12 acting from a space inside the endless chain 7 against the chain 7. The tensioning elements 11 and 12 are thus parts of the adjusting device for changing the phase angle between the shaft 6, which is a driving shaft, and the shaft 5 which is driven. Both tensioning elements 11 and 12 are attached to a slide 13 in such a manner as to be advantageously adjustable in the tensioning direction. The slide 13 is guided on a frame 14 fixed to a housing of the device in such a manner as to be movable perpendicularly to a plane including the axes of the shafts 5 and 6. The slide 13 is screwable on a threaded spindle 15 by means of a centrally disposed female thread formed in the slide 13, the spindle 15 being rotatable, either by hand or by motor means, in a frame 14 which is fixed to the housing. The embodiment of the invention shown in FIG. 4 has a coupling or clutch 16 for connecting the spindle 15 to a servo-motor 17 for the purpose of adjusting the phase positions or settings of the shafts 5 and 6.

Another chain tensioner with two tensioning elements 18 and 19, which act from outside against the slack side 7b of the chain 7, are provided for the slack side 7b of the chain 7. The two tensioning elements 18 and 19 are oscillatably held on free ends of a yoke 20. The yoke 20 is movably guided on an extension 21 of the spindle 15 and is loaded in the tensioning direction by means of a spring 22, which is braced, at one end thereof, against the yoke 20 and, at the other end thereof, against a support bearing fixed to the housing. The tension of the spring 22 thus determines the tensioning pressure of the tensioning elements 18 and 19 from outside against the slack side 7b of the chain 7.

Figure 5:
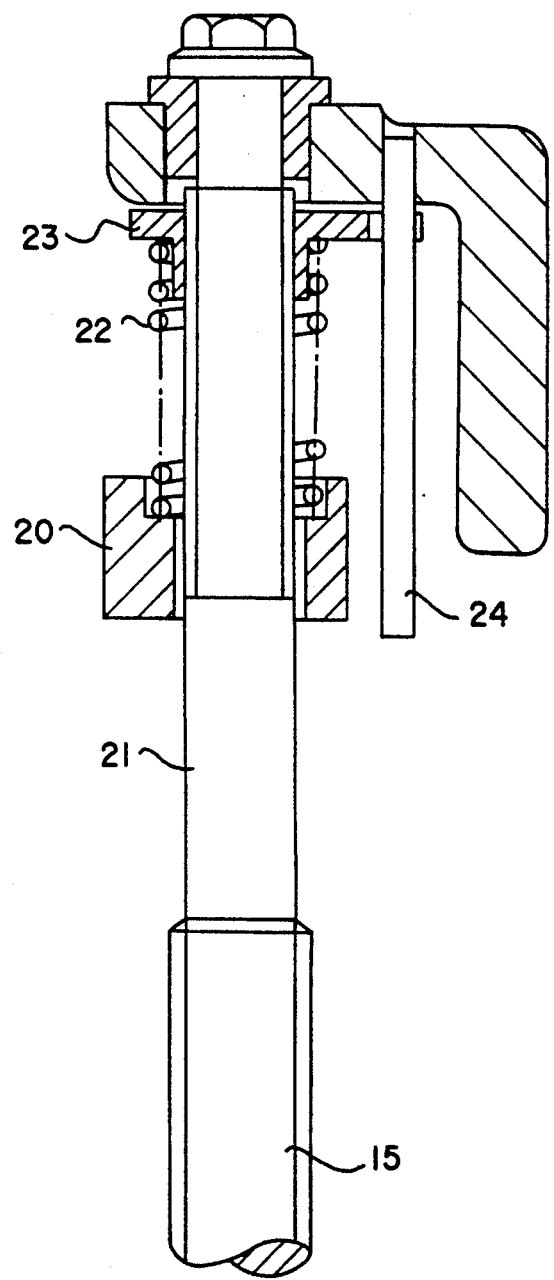
FIG. 5 is an enlarged fragmentary view, partly in section, illustrating another embodiment of the device.

In the embodiment shown in FIG. 5, the spring 22 has a clamping length which is not changed when the tensioning elements 11 and 12 are adjusted. This is achieved by providing that the extension 21 of the spindle 15 is formed with a male thread whereon a female thread of an adjustable counterbearing 23 is threaded, the counterbearing 23 being non-rotatable due to a guide 24 and, accordingly, being adjustable only in axial direction. The thread on the extension 21 has a pitch which differs from the pitch of the thread on the spindle 15, so that the clamping length of the spring 22 and, accordingly, the spring force of the latter remain virtually constant throughout the entire range of adjustment.

The tensioning elements 18 and 19 acting from outside the endless chain 7 under spring tension against the slack side 7b produce a greater angle of contact of the tensioning element 12 acting from inside against the slack side 7b, thereby resulting in the formation of a chain storage which acts in both directions of adjustment beyond the stretched position of the slack side 7b.

Figure 3A:
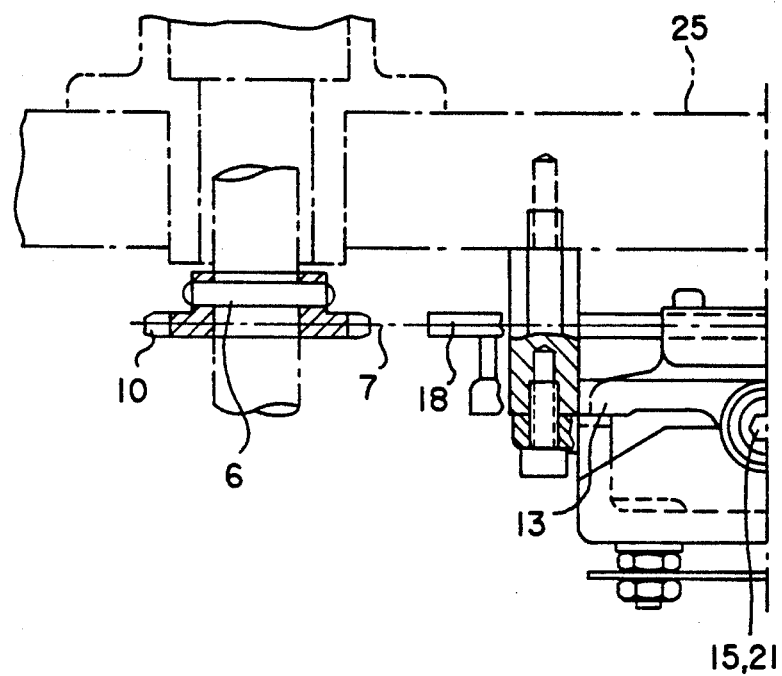
FIGS. 3a and 3b together are a top plan view, partly in horizontal section, of FIGS. 2a and 2b.
Figure 3B:
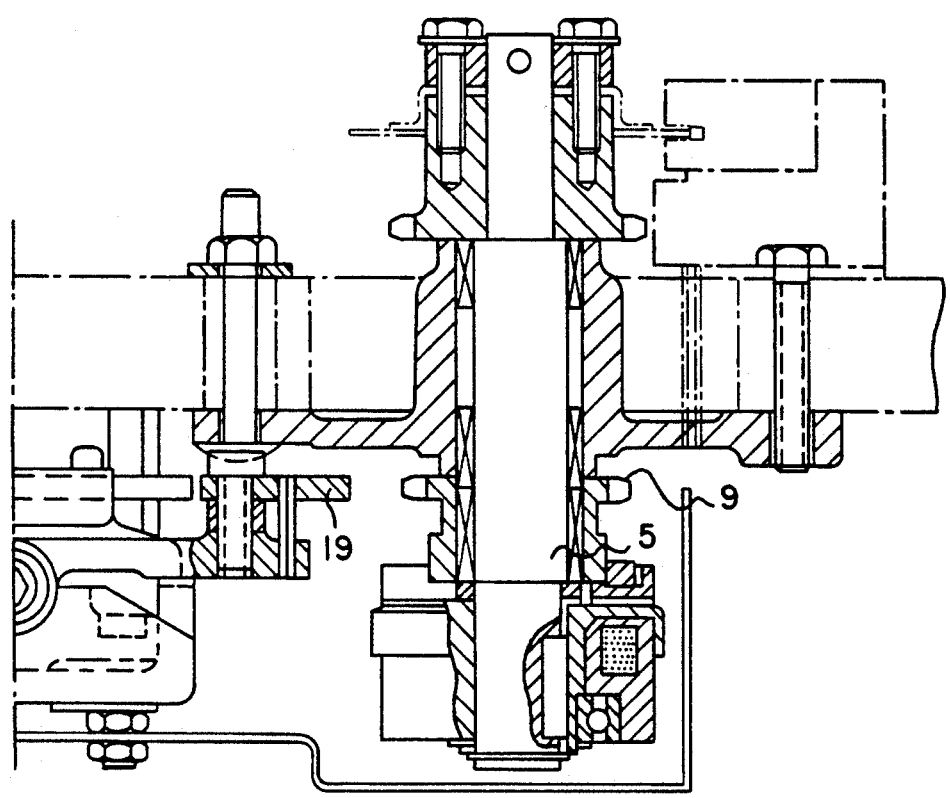

From the views of FIGS. 3a and 3b, 4 and 5, it is apparent that the adjusting device for the phase position, according to the invention, is disposed on the drive side outside of the chain drive for transmitting the drive forces from the shaft 6 of the printing unit to the shaft 5 of the feeder, so that the chain 7 revolves between the components of the adjusting device and the housing wall 25. The tensioning elements 11 and 12, which project into the plane of revolution 26 of the chain 7 and act from the inside against the tight side 7a and the slack side 7b, respectively, and the tensioning elements 18 and 19 which, as viewed in the revolving direction of the chain 7, respectively act downstream of the tensioning element 12 and upstream of the tensioning element 12, from outside against the slack side 7b of the chain 7, are each mounted on respective booms, as is illustrated in FIGS. 3a and 3b.

I claim:

1. Adjusting device for varying a phase angle between a drive shaft and a driven shaft of an endless chain drive extending between a sheet feeder and a printing unit of a printing press and being formed with a tight side and a slack side defining an inner space therebetween, comprising first tensioning means for applying a tensioning force outwardly from an inner space against a slack side of an endless chain drive, second tensioning means for applying a tensioning force outwardly from the inner space against a tight side of the endless chain drive, a slide carrying said first and second tensioning means, means for displacing said slide substantially perpendicularly to a plane in which a drive shaft and a driven shaft are disposed, additional chain tensioning means for applying a force from outside the endless chain drive against the slack side thereof, and means for adjustably moving said additional chain tensioning means with respect to said first tensioning means, said additional chain tensioning means comprising two inwardly acting tensioning elements, and means for varying said inwardly acting tensioning elements in position.

2. Adjusting device according to claim 1, wherein said additional chain tensioning means comprise a yoke, said means for adjusting further adjusting said yoke with respect to said slide, and said two inwardly acting tensioning elements mounted at respective ends of said yoke, said two inwardly acting tensioning elements being disposed at respective opposite sides of said outwardly acting first tensioning means.

3. Adjusting device according to claim 2, including spring means for applying a load to said tensioning elements so that said tensioning elements act from the outside against the slack side of the endless chain drive.

4. Adjusting device for varying a phase angle between a drive shaft and a driven shaft of an endless chain drive extending between a sheet feeder and a printing unit of a printing press and being formed with a tight side and a slack side defining an inner space therebetween, comprising first tensioning means for applying a tensioning force outwardly from an inner space against a slack side of an endless chain drive, second tensioning means for applying a tensioning force outwardly from the inner space against a tight side of the endless chain drive, a slide carrying said first and said second tensioning means, means for displacing said slide substantially perpendicularly to a plane in which a drive shaft and a driven shaft are disposed, additional chain tensioning means for applying a force from outside the endless chain drive against the slack side thereof, and means for adjustably moving said additional chain tensioning means with respect to said first tensioning means, said additional chain tensioning means comprising a yoke, said means for adjusting further adjusting said yoke with respect to said slide, and two inwardly acting tensioning elements mounted at respective ends of said yoke, said two tensioning elements being disposed at respective opposite sides of said outwardly acting first tensioning means, including a spindle extending transversely to said plane in which the shafts are disposed and being formed with an extension, a spring surrounding said spindle extension, said yoke being displaceably guidable on said spindle extension and forming a counterbearing for said spring at one end thereof, and a housing for the adjusting device, said spring being supported at the other end thereof by a counterbearing formed on said housing.

5. Adjusting device according to claim 4, including means for adjusting said counterbearing formed on said housing.

6. Adjusting device according to claim 5, wherein said counterbearing formed on said housing is formed with a female thread engageable with a male thread formed on said extension of said spindle for adjusting said last mentioned counterbearing with respect to said housing, said female thread of said last-mentioned counterbearing having a different pitch from that of said thread formed on said spindle.

* * * * *